United States Patent [19]

Pressler

[11] Patent Number: 5,702,162
[45] Date of Patent: Dec. 30, 1997

[54] LIVE SPINDLE FOUR WHEEL DRIVE MOTOR VEHICLE WHEEL END ASSEMBLY

[75] Inventor: John E. Pressler, Roanoke, Ind.

[73] Assignee: Dana Corporation, Toledo, Ohio

[21] Appl. No.: 413,498

[22] Filed: Mar. 30, 1995

[51] Int. Cl.$^6$ ............................................. B60B 27/00
[52] U.S. Cl. ..................... 301/105.1; 180/247; 384/448; 384/571
[58] Field of Search ............... 301/105.1, 124.1; 384/448, 571, 589, 544; 180/247, 252, 253, 258, 259; 324/173, 174; 464/178, 906

[56] References Cited

U.S. PATENT DOCUMENTS

| | | |
|---|---|---|
| 4,150,553 | 4/1979 | Aucktor . |
| 4,331,210 | 5/1982 | Petrak . |
| 4,333,695 | 6/1982 | Evans .................................. 384/571 X |
| 4,761,018 | 8/1988 | Abbruzzi et al. . |
| 4,960,333 | 10/1990 | Faye et al. ........................ 384/448 X |
| 5,011,302 | 4/1991 | Mott et al. . |
| 5,037,214 | 8/1991 | Dougherty ............................ 384/571 |
| 5,085,519 | 2/1992 | Dougherty . |
| 5,129,741 | 7/1992 | Deane . |
| 5,141,088 | 8/1992 | Kurihara et al. . |
| 5,159,754 | 11/1992 | Vancsik . |
| 5,263,900 | 11/1993 | Stimson . |
| 5,296,805 | 3/1994 | Clark et al. ....................... 384/448 X |
| 5,353,890 | 10/1994 | Clohessy ........................... 180/247 |
| 5,366,300 | 11/1994 | Deane et al. . |
| 5,494,358 | 2/1996 | Dougherty ........................ 384/571 X |

*Primary Examiner*—Russell D. Stormer
*Attorney, Agent, or Firm*—Oldham & Oldham Co., LPA

[57] ABSTRACT

The present invention relates to a live spindle wheel end assembly wherein the spindle also functions as the inner race for the wheel bearings and wherein the spindle includes an outwardly extending barrel extension capable of receiving a manual or an automatic hub lock mechanism to selectively couple the spindle to a drive axle that may be provided in four-wheel drive applications so that the spindle may receive torque from the drive axle.

4 Claims, 1 Drawing Sheet

LIVE SPINDLE FOUR WHEEL DRIVE MOTOR VEHICLE WHEEL END ASSEMBLY

FIELD OF INVENTION

The present invention relates generally to a wheel end assembly and more particularly to a live spindle wheel end assembly wherein the outer surface of the spindle also functions as the inner race for the wheel bearings and wherein the spindle includes an outwardly extending barrel extension capable of receiving a manual or an automatic hub lock assembly to selectively couple the spindle to a drive axle of a four-wheel drive vehicle so that the spindle receives torque from the drive axle.

BACKGROUND OF THE INVENTION

Motor vehicle wheel end assemblies may be divided into two general categories-dead spindle and live spindle. Dead spindle wheel end assemblies generally include a non-rotatable spindle extending outward from a mounting member such as a steering knuckle which is typically attached to a vehicle chassis. A wheel hub including a wheel mounting flange, is supported for rotation on the spindle by bearings. A wheel and tire assembly may then be attached to the wheel mounting flange so that the wheel is mounted coaxially with the spindle and wheel hub.

Wheel end assemblies including a dead spindle can be used on a part time four wheel drive vehicle that is free running when the driver has selected two-wheel drive mode. The wheel end assembly receives torque from a drive axle when the driver has selected four-wheel drive mode, wherein a bore is formed through the spindle to accept a drive axle that originates at a differential. The drive axle is coupled to rotate with a first gear or member of a hub lock mechanism and the wheel hub is coupled to rotate with a second gear or member of the hub lock mechanism. The hub lock mechanism is designed to selectively couple the drive axle to the wheel hub by engaging the first hub lock member with the second hub lock member thereby allowing the drive axle to transmit torque to the wheel hub and ultimately to the vehicle wheel/tire assembly mounted thereon. For a driving/steering axle, a constant velocity universal joint is also provided between the differential and the wheel end assembly.

Live spindle wheel end assemblies generally include a spindle which is supported for rotation by bearings within a bore formed in a mounting member such as a steering knuckle which is attached to a vehicle chassis. A wheel mounting flange is formed in the spindle or is attached thereto by welding or another suitable method. To provide a live spindle wheel end assembly for use on a four wheel drive vehicle that is free running when the driver has selected two-wheel drive mode and that receives torque from a drive axle when the driver has selected four-wheel drive mode, a bore is formed through the spindle to accept a drive axle that originates at a differential. The drive axle is coupled to rotate with a first gear or member of a hub lock mechanism and the spindle is coupled to rotate with a second gear or member of the hub lock mechanism. The hub lock mechanism is designed to selectively couple the drive axle to the spindle by engaging the first hub lock member with the second hub lock member thereby allowing the drive axle to transmit torque to the spindle, and ultimately to the vehicle wheel/tire assembly. For a driving/steering axle, a constant velocity universal joint must also be provided between the differential and the wheel end assembly.

In general, live spindle wheel end assemblies are supported for rotation within the bore of the mounting member by bearing assemblies including an inner race, an outer race, and a plurality of rolling elements circumferentially spaced between the inner and outer races. These bearing assemblies are typically slid onto the outer surface of the spindle and held in place by a lock-nut or another suitable retainer. However, it has been found that the inner bearing race may be formed directly in the outer surface of the spindle, thereby eliminating the need to provide a bearing assembly including a separate inner bearing race. Such a bearing assembly provides numerous advantages such as ease of assembly and disassembly, ease of service, less unsprung vehicle weight, and potentially lower cost. However, the use of these wheel end assemblies having the inner bearing races formed directly on the spindle has been limited to two-wheel drive applications. With the increasing popularity of four-wheel drive vehicles, there has been found a need to provide such a wheel end assembly that is capable of receiving a hub lock mechanism to selectively drivingly couple a drive axle to the spindle so that torque may be transmitted from the drive axle through the spindle and to a road wheel mounted thereon.

SUMMARY OF THE INVENTION

The present invention is therefore directed to a wheel end assembly comprising a live spindle having an outwardly extending barrel capable of receiving a hub lock mechanism. The spindle includes an outer surface and is supported for rotation in a mounting member by a bearing assembly comprising at least a first and second row of plural rolling elements wherein the plural rolling elements of the first and second rows are provided in circumferentially spaced apart relationship about the outer surface of the spindle, and wherein the plural rolling elements of each of the first and second rows are disposed between an outer bearing race and the outer surface of the spindle such that the spindle itself provides an inner bearing race for the plural rolling elements of the bearing assembly.

The present invention provides the advantages associated with a one-piece live spindle/inner bearing race and combines the ability to utilize the wheel end assembly in four-wheel drive applications where a hub lock mechanism must be employed.

DETAILED DESCRIPTION OF THE PREFERRED EMBODIMENT

Figure 1:
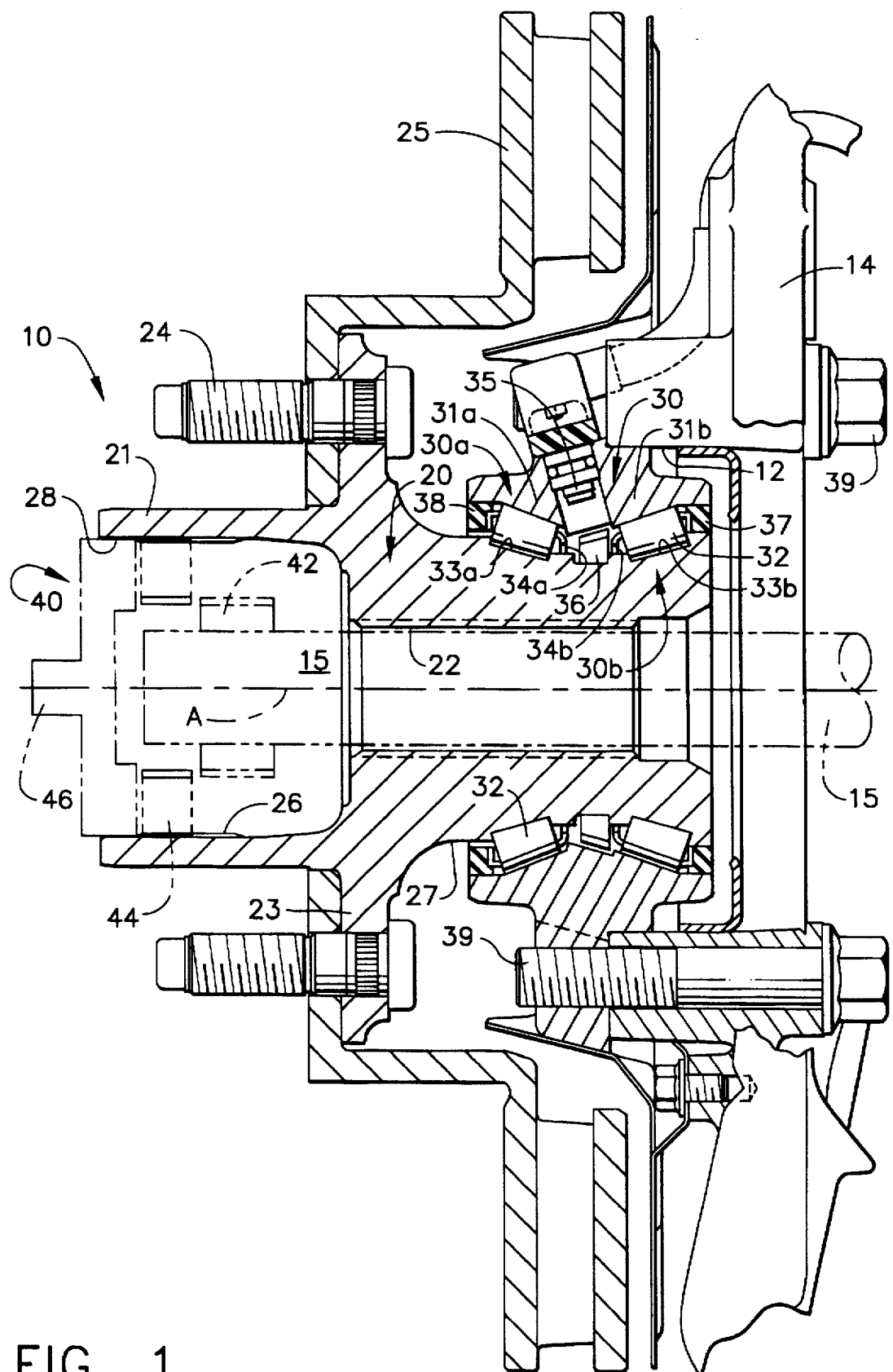
FIG. 1 is a sectional view illustrating the wheel end assembly of the present invention.

The wheel end assembly of the present invention is shown generally at 10 in FIG. 1 and comprises a live spindle 20 supported for rotation by a bearing assembly 30 within a bore 12 formed through a mounting member 14. Wheel end assembly 10 is shown as it may be utilized on a steering axle of a part time four wheel drive vehicle that may be selectively driven in two or four-wheel drive modes. In the four-wheel drive mode, a drive axle, shown in phantom at 15, is provided to deliver torque to spindle 20 as is described in more detail below. In this particular application therefore, mounting member 14 is typically a steering knuckle which may be attached to a vehicle chassis. Spindle 20 includes an outer surface 27 and a wheel mounting flange 23 to which a vehicle road wheel is coupled utilizing a plurality of wheel mounting studs 24. A brake rotor 25 is also mounted to flange 23 by bolts 24 to rotate therewith.

Bearing assembly 30 comprises a first row 30a of plural rolling elements 32 and a second row 30b of plural rolling elements 32 wherein the rolling elements 32 are provided as tapered roller bearings or other suitable bearings which are maintained in a circumferentially spaced apart relationship about outer surface 27 of spindle 20 by a cage member 34. A sensor 35 is preferably provided as an integral part of bearing assembly 30 to act in cooperation with a target wheel or tone ring 36 provided about the outer surface 27 of spindle 20 between the first and second rows 30a, 30b of rolling elements 32. The sensor 35 measures the angular velocity of the spindle 20 for anti-lock braking, traction control, or other vehicle systems. An inner seal 37 and an outer seal 38 are provided to inhibit the entry of dirt, water, or other contaminants into bore 12 adjacent to bearing assembly 30.

First row 30a and second row 30b of plural rolling elements 32 of bearing assembly 30 each respectively have an outer bearing race 31a, 31b and an inner bearing race 33a, 33b. It can be seen that inner bearing races 33a, 33b are each formed integrally in the outer surface 27 of spindle 20. Bearing assembly 30 may be secured within bore 12 of mounting member 14 by bolts 39 such that spindle 20 is supported for rotation within bore 12 upon rolling elements 32 which are in turn disposed between the outer bearing races 31a, 31b and the inner bearing races 33a, 33b. The spindle 20 and related components such as bearing assembly 30 may be secured within bore 12 of mounting member 14 by a locknut or other suitable retainer. The formation of inner bearing races 33a, 33b directly in the outer surface 27 of spindle 20 provides a wheel end assembly 10 with numerous advantages such as being lighter weight, less complex, and easier to assemble and maintain. Furthermore, forming bearing inner races 33a, 33b directly in outer surface 27 of spindle 20 can reduce cost of the wheel end assembly 10.

Spindle 20 includes a central bore 22 formed therethrough on an axis A. Bore 22 is designed to slidably accept a drive axle or shaft as is shown in phantom at 15 when wheel end assembly 10 is used in conjunction with a four-wheel drive vehicle. Drive axle 15 typically originates at a vehicle front differential (not shown) and may be coupled through a constant velocity universal joint (not shown) before entering bore 22 of spindle 20. When the vehicle to which wheel end assembly 10 is attached is in two wheel drive mode, drive axle 15 does not receive torque from the front differential of the vehicle. Consequently, in two-wheel drive mode, spindle 20 rotates within bore 12 of mounting member 14 upon rolling elements 32 independently about the drive shaft 15. Needle bearings (not shown) may be disposed between drive axle 15 and bore 22 to rotatably support spindle 20 on drive axle 15. In this manner, spindle 20 free wheels in two-wheel drive mode so that drive shaft 15 and components connected thereto such as the constant-velocity joint, front differential gearing, and components of the four-wheel drive transfer case are not required to rotate in response to rotation of spindle 20. The free wheeling reduces wear on the four-wheel drive components and also increases gas mileage and performance when the vehicle is in two-wheel drive mode.

When the vehicle is in four-wheel drive mode, drive shaft 15 receives torque from a differential and rotates in response thereto. Spindle 20 includes an outwardly extending barrel 21 including internal splines 26 or other means for receiving a hub lock mechanism as is shown schematically in phantom at 40 that is capable of selectively coupling drive shaft 15 to barrel 21 of spindle 20 when the vehicle is in four-wheel drive mode so that drive shaft 15 may transfer torque to the spindle 20 and consequently to a road wheel secured to flange 23 by bolts 24. The particular hub lock mechanism shown schematically herein does not form part of the invention and the invention is not meant to be limited for use in conjunction with any particular hub lock mechanism. Rather, the wheel end assembly 10 of the present invention is meant to be capable of receiving any known manual or self-locking hub lock mechanism within or substantially within outwardly extending barrel 21 of spindle 20.

Hub lock 40 utilizes a first hub lock gear or member 42 coupled to drive shaft 15 to rotate therewith and a second hub lock gear or member 44 coupled to rotate with barrel 21 of spindle 20. Additionally, at least one of members 42, 44 is axially movable on axis A such that upon manual rotation of dial 46, members 42, 44 become engaged to thereby couple drive shaft 15 to barrel 21 of spindle 20. Other hub lock mechanisms may automatically couple shaft 15 to spindle 20 when a vehicle switches from two-wheel drive to four-wheel drive. Wheel end assembly 10 is designed to be used in conjunction with either a manual or an automatic hub-clutch mechanism. Suitable hub lock mechanisms for use in conjunction with the present invention are manufactured and/or sold by various companies including Dana Corporation, Toledo Ohio and Warn Industries, Milwaukie, Oreg.

It may be seen therefore that the present invention provides a wheel end assembly 10 capable of receiving a hub lock mechanism 40 wherein the outer surface 27 of the spindle 20 of the wheel end assembly 10 also functions as the inner bearing race 31a, 31b for the plural rolling elements 32 of the first and second rows 30a, 30b of the bearing assembly 30. The wheel end assembly 10 may also be used in conjunction with a non-driven axle without modification. For example, wheel end assembly 10 may be used on a non-driving axle of a two-wheel drive vehicle. It is thought preferable in such an instance to cover opening 28 of barrel 21 provided on spindle 20 with a cap to inhibit the entrance of dirt, water, and other contaminants into barrel 21 and bore 22 and to provide a more aesthetically pleasing wheel end assembly 10.

While the foregoing description has set forth the preferred embodiment of the invention in particular detail, it must be understood that numerous modifications, substitutions, and changes may be undertaken without departing from the true spirit and scope of the present invention as defined by the ensuing claims.

What is claimed is:

1. A live spindle four wheel drive motor vehicle wheel end assembly, comprising:

a live spindle having an outwardly extending barrel capable of receiving a hub lock mechanism, said live spindle includes an outer surface and is supported for rotation in a mounting member by a bearing assembly including a first row of tapered bearings and a second row of tapered bearings wherein said first row of tapered bearings and said second row of tapered bearings are circumferentially spaced about the outer surface of said live spindle;

said first row of tapered bearings and said second row of tapered bearings are positioned directly between an outer bearing race and said outer surface of said live spindle such that said live spindle acts as an inner bearing race for said first row of tapered bearings and said second row of tapered bearings of said bearing assembly; and said live spindle includes a first circumferential groove on said outer surface of said live spindle which acts as said inner bearing race for said first row of tapered roller bearings and said live spindle includes a second circumferential groove on said outer surface of said live spindle which acts as said inner bearings race for said second row of tapered roller bearings and the cross-sectional configuration of said first circumferential groove and said second circumferential groove formed on said outer surface of said live spindle each include a flat bottom portion and two upstanding wall portions which are substantially perpendicular to said bottom portion.

2. The live spindle four wheel drive motor vehicle wheel end assembly as recited in claim 1, further comprising a tone ring around said outer surface of said live spindle between said first row of tapered bearings and said second row of tapered bearings and a sensor provided as a part of said bearing assembly wherein said sensor acts in conjunction with said tone ring to measure the angular velocity of said live spindle.

3. The live spindle four wheel drive motor vehicle wheel end assembly as recited in claim 1, wherein said outwardly extending barrel of said live spindle includes internal splines for slidably receiving said hub lock mechanism.

4. The live spindle four wheel drive motor vehicle wheel end assembly as recited in claim 2, wherein said outwardly extending barrel of said live spindle includes internal splines for slidably receiving said hub lock mechanism.

* * * * *